(12) United States Patent
Sigmund et al.

(10) Patent No.: US 10,273,377 B2
(45) Date of Patent: Apr. 30, 2019

(54) SUPERHYDROPHOBIC AND OLEOPHOBIC CERAMIC POLYMER COMPOSITE COATING

(71) Applicant: University of Florida Research Foundation, Inc., Gainesville, FL (US)

(72) Inventors: Wolfgang M. Sigmund, Gainesville, FL (US); Shu-Hau Hsu, Gainesville, FL (US); Ravi Kumar Vasudevan, Somerville, MA (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 13 days.

(21) Appl. No.: 15/327,536

(22) PCT Filed: Jul. 24, 2015

(86) PCT No.: PCT/US2015/042003
§ 371 (c)(1),
(2) Date: Jan. 19, 2017

(87) PCT Pub. No.: WO2016/014952
PCT Pub. Date: Jan. 28, 2016

(65) Prior Publication Data
US 2017/0174928 A1 Jun. 22, 2017

Related U.S. Application Data

(60) Provisional application No. 62/029,206, filed on Jul. 25, 2014.

(51) Int. Cl.
| | |
|---|---|
| C04B 35/14 | (2006.01) |
| C09D 127/18 | (2006.01) |
| C09D 7/40 | (2018.01) |
| C09D 5/16 | (2006.01) |
| C09D 7/62 | (2018.01) |
| C04B 35/46 | (2006.01) |
| C04B 35/622 | (2006.01) |
| C04B 35/624 | (2006.01) |
| C08K 7/10 | (2006.01) |
| C08K 9/04 | (2006.01) |
| C09D 5/00 | (2006.01) |
| C09D 129/10 | (2006.01) |
| D01D 5/00 | (2006.01) |
| D01F 9/10 | (2006.01) |
| D06M 13/517 | (2006.01) |
| C08K 7/04 | (2006.01) |

(52) U.S. Cl.
CPC ............ *C09D 127/18* (2013.01); *C04B 35/14* (2013.01); *C04B 35/46* (2013.01); *C04B 35/624* (2013.01); *C04B 35/6224* (2013.01); *C04B 35/62259* (2013.01); *C08K 7/10* (2013.01); *C08K 9/04* (2013.01); *C09D 5/00* (2013.01); *C09D 5/1681* (2013.01); *C09D 7/62* (2018.01); *C09D 7/70* (2018.01); *C09D 129/10* (2013.01); *D01D 5/0038* (2013.01); *D01F 9/10* (2013.01); *D06M 13/517* (2013.01); *C08K 7/04* (2013.01); *D06M 2200/11* (2013.01); *D06M 2200/12* (2013.01); *D06M 2400/01* (2013.01); *D10B 2101/08* (2013.01); *D10B 2401/021* (2013.01)

(58) Field of Classification Search
CPC ........... C09D 127/18; C09D 7/70; C09D 7/62
See application file for complete search history.

(56) References Cited

U.S. PATENT DOCUMENTS

| | | | | |
|---|---|---|---|---|
| 9,475,105 B2 * | 10/2016 | Sigmund | .................. | B05D 1/62 |
| 2010/0184346 A1 | 7/2010 | Qi et al. | | |
| 2010/0310774 A1 | 12/2010 | Wu et al. | | |
| 2011/0195181 A1 | 8/2011 | Jin et al. | | |
| 2014/0242345 A1 * | 8/2014 | Park | ........................ | H01B 1/24 428/172 |
| 2017/0158831 A1 * | 6/2017 | Sigmund | .................... | C08J 5/18 |
| 2017/0166757 A1 * | 6/2017 | Sigmund | .................. | C09D 7/62 |
| 2017/0267576 A1 * | 9/2017 | Sigmund | .................. | C09D 7/62 |

FOREIGN PATENT DOCUMENTS

| | | |
|---|---|---|
| JP | 07-048464 | 2/1995 |
| WO | WO 2006/089531 | 8/2006 |

OTHER PUBLICATIONS

Biswas, A. et al., "Flexible ceramic nanofibermat electrospun from $TiO_2$—$SiO_2$ aqueous sol," *Ceramics International*, 2012, pp. 883-886, vol. 38.
Gowri, S. et al., "Polymer Nanocomposites for Multifuntional Finishing of Textiles—a Review," *Textile Research Journal*, 2010, pp. 1290-1306, vol. 80, No. 13.

* cited by examiner

*Primary Examiner* — Hannah J Pak
(74) *Attorney, Agent, or Firm* — Timothy H. Van Dyke; Beusse, Wolter, Sanks & Maire PLLC

(57) ABSTRACT

An article having a superhydrophobic or oleophobic ceramic polymer composite surface is formed by the coating of the surface with a fluid comprising a polymer, copolymer, or polymer precursor and a plurality of glass, ceramic, or ceramic-polymer particles. The particles have fluorinated surfaces and at least a portion of the polymer's repeating units that are fluorinated or perfluorinated. The composite can be a cross-linked polymer.

10 Claims, 4 Drawing Sheets

SUPERHYDROPHOBIC AND OLEOPHOBIC CERAMIC POLYMER COMPOSITE COATING

CROSS-REFERENCE TO RELATED APPLICATIONS

This application is the U.S. national stage application of International patent application No. PCT/US2015/042003, filed Jul. 24, 2015, which claims the benefit of U.S. Provisional Application Ser. No. 62/029,206, filed Jul. 25, 2014, the disclosures of which are hereby incorporated by reference in their entireties, including all figures, tables and drawings.

BACKGROUND OF INVENTION

Surface cleaning and repair of, for example, buildings, vehicles, and energy collection devices, are time-consuming and costly, and a surface with an inherent repellency of water, oil, and dirt can be a significant advantage. Surface wetting is governed by surface-energy parameters between the surface and the contacting liquid or solid surface. Where the sum of the free surface energies between materials components is very low, adhesion between these materials is weak. Hence, it is generally beneficial to lower the free surface energy of an edifice in order to ignore its cleaning and repair. Non-stick materials, such as perfluorinated hydrocarbons, for example, Teflon®, have very low surface energies such that few materials adhere. The wetting of these low surface energy materials is reflected in the contact area that is observed between the surface of the low surface energy solid and a wetting material. The interactions between these materials generally result from van der Waals forces.

Nature diminishes the interaction of a surface of a solid and water without resorting to materials with surface energies as low as Teflon®. This is achieved by reducing the amount of the surface that contacts the water. For example, lotus leaves, cabbage leaves, and various fruits are covered by small wax bumps that reduce the van der Waals contact area presented to a water droplet that forms due to its high surface tension, which significantly reduces the adhesion of the droplets to the surface. These superhydrophobic textured surfaces display water contact angles that are in excess of 150° and display low sliding angles, which is the critical angle from horizontal of the inclined surface where a water droplet of a defined mass rolls off the inclined surface. This "Lotus effect" provides a self-cleaning surface, as contact water droplets adhere to dust particles and, to a much lesser degree, to some oils that are poorly adhered to the surface, which allows the "dirt" to be carried away as the water droplet rolls off the surface.

Recently, products have been introduced to the market for environmental coatings and other surfaces based on the "lotus effect" that display superhydrophobicity, where water readily rolls off with particulates that have soiled the surface when exposed to water. StoCoat® Lotusan® is a one-part coating that is brushed, rolled, or sprayed onto a surface and Rust Oleum® Neverwet® is available for two-part spray coating. Both of these products have durability and performance issues and are not oil repellent.

Most oils are not readily removed from such hydrophobic surfaces, as the enlarged surface area increases the effective van der Waals interface and the Lotus-effect surface does not repel oils that cannot interact more favorably with water than the textured surface. Oil repellent surfaces are an engineering challenge because the surface tensions of oily liquids are usually in the range of 20-30 mN/m. Hence, the essential criterion, for having a surface with oleophobicity, is to maintain oil drops in a Cassie-Baxter (CB) state, one where vapor pockets are trapped underneath the liquid. The CB state is dependent on the surface's structure and the surface energy of the material. If the structure and surface area are insufficient, the meta-stable energetic state is transformed into Wenzel state. The geometric features that allow this state have re-entrant structures, such as mushroom heads, micro-hoodoos, or horizontally aligned cylindrical rods. A re-entrant structure implies that a line drawn vertically, from the base solid surface through the geometric feature, must proceed through more than one solid interface of that feature.

Although oleophobic surfaces have been produced, there remains a need for superhydrophobic and oleophobic surfaces that can be produced easily on substrates and display a durability that is not presently available.

BRIEF SUMMARY

A ceramic-polymer composite of a polymer with fluorinated repeating units as a matrix having dispersed glass, ceramic, and/or ceramic-polymer particles with fluorinated surfaces can be formed on a substrates surface from solution. The composite renders the substrates surface superhydrophobic and oleophobic.

DETAILED DISCLOSURE

Figure 1:
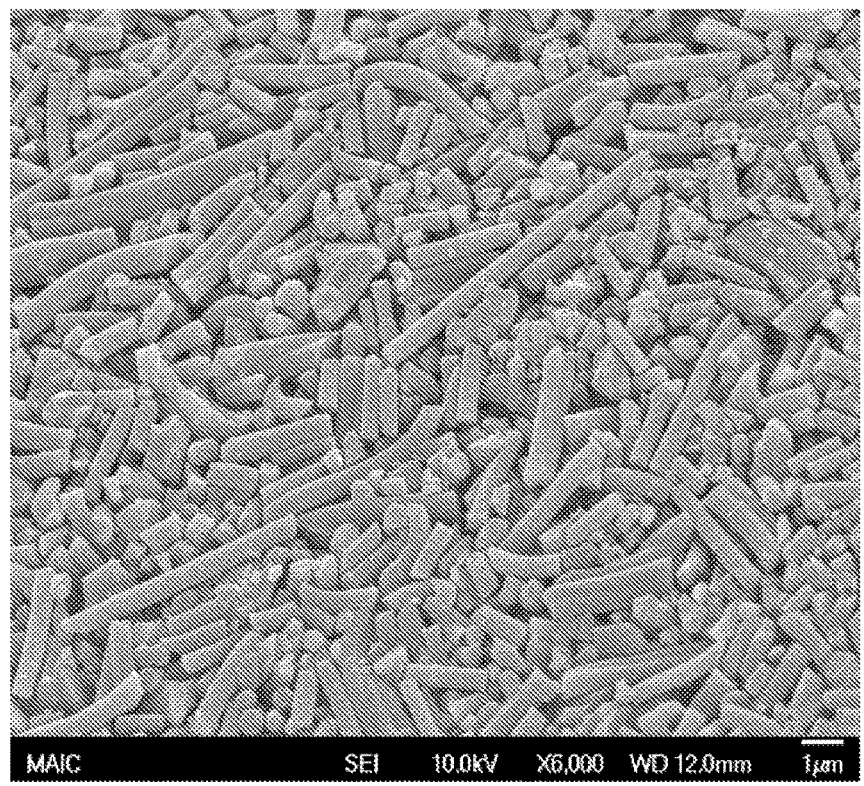
FIG. 1 is a scanning electron micrograph of a collection of the titania-silica fibers to be used in the ceramic-polymer composite, according to an embodiment of the invention.

Embodiments of the invention are to articles having a superhydrophobic and oleophobic coated surface and to methods to produce and to apply the coatings on a compatible surface. According to an embodiment of the invention, the coated surface comprises a ceramic-polymer composite that displays the plastron effect and the Lotus effect. After coating of a surface, a superhydrophobic state is achieved. The ceramic-polymer composite comprises a polymer matrix with dispersed ridged and/or flexible glass, ceramic, and/or ceramic-polymer particles that display an aspect ratio of 1:1 to 1:500. In embodiments of the invention, the aspect ratio can be 1:2 to 1:400, 1:3 to 1:300, 1:4 to 1:200, or 1:5 to 1:100: The ceramic or ceramic-polymer particles can be from 1 nm to 100 microns in any axial dimension. The glass, ceramic, and/or ceramic-polymer particles can be 10 to 90 weight percent of the ceramic-polymer composite. The matrix polymer and ceramic and/or ceramic-polymer particles are chosen on the basis of compatibility with the substrate surface to be coated and the inter-compatibility of the polymer and the particles. The polymeric matrix can be a thermoplastic polymer or thermoset polymer. The substrate can be a polymer, a glass, a ceramic, a metal, or any combination thereof.

The glass, ceramic, or ceramic-polymer particles can comprise $ZnO$, $CdO$, $SiO_2$, $GeO_2$, $TiO_2$, $ZrO_2$, $CeO_2$, $BeO$, $SnO_2$, $Al_2O_3$ (including corundum and boehmite), $AlO(OH)$, $MgO$, $ZrO_2In_2O_3$, $La_2O_3$, $Fe_2O_3$, $Cu_2O$, $TaZOS$, $Nb_2O_5$, $V_2O_5$, $MoO_3$, $WO_3$, indium-tin-oxide (ITO), antimony-tin-oxide (ATO), fluorine-doped tin oxide (FTO), Perovskites including $BaTiO_3$ and $PbTiO_3$, chalcogenides, $CdS$, $ZnS$, $PbS$, $AgZS$, $GaSe$, $CdSe$, $ZnSe$, $ZnTe$, $CdTe$, $AgCl$, $AgBr$, $AgI$, $CuCl$, $CuBr$, $CdI_2$, $PbI_2$, $CdC_2$, $SiC$, $MoSi_2$, $AlAs$, $GaAs$, $GeAs$, $InSb$, $BN$, $AlN$, $Si_3N_4$, $Ti_3N_4$, $GaP$, $InP$, $Zn_3P_2$, $Cd_3P_2$, metal carbonates, metal sulfates, metal phosphates, metal silicates, metal zirconates, metal aluminates, metal stannates, Si, talcum, clays (kaolin), mica, magnetite, maghemite, spinels, mullite, eskolaite, tialite, bioceramics including calcium phosphate and hydroxyapatite, borosilicate glass, soda lime glass and silica glass, silicon nitride, silicon carbide, boronitride, borocarbide, quartz, cristobalite, tripolite, novaculite, diatomite, silica, pyrogenic silicic acids, precipitated silicic acids, silica gels, silicates including talcum, pyrophyllite, kaolin, mica, muscovite, phlogopite, vermiculite, Wollastonite, and perlites, calcites, dolomites, chalk, synthetic calcium carbonates, soot, heavy spar, light spar, iron mica, and any other glass, ceramic or ceramic-polymer particle that can be formed with an aspect ratio greater than 1:1.

The glass, ceramic, or ceramic-polymer particles are treated by a fluorinating agent to form a monolayer or are coated with a very thin layer of a fluorinated polymer or copolymer with affinity for the particles' surface. The resulting surface modified particles are dispersible in a polymer or a prepolymer, to form a dispersion that can be applied to a surface by dip coating, roll coating, brushing, spraying, ink jet printing, or any other method by which the dispersion can be transferred to a desired solid surface. The dispersion can be within a polymer in solution, a liquid polymer, or a polymer precursor, such as a reactive monomer or oligomer, which can be a neat mixture or a mixture in solution.

The fluorinating agent can be a fluorinated silane-coupling agent. Suitable agents have the structure: $R_nSi_{(4-x)}$, where n is 1-3, X is independently a hydroxyl group or a hydrolysable group, and R is independently a non-hydrolysable group, wherein at least one R group is a fluorinated hydrocarbon group. X is H, Cl, Br, I, $C_1$-$C_6$ alkoxy, $C_6$-$C_{10}$ aryloxy, $C_1$-$C_6$ acyloxy, amino, $C_1$-$C_3$ alkylamino, or $C_2$-$C_6$ dialkylamino. R is $C_1$-$C_6$ alkyl, phenyl, $C_2$-$C_5$ alkenyl, or a $C_3$-$C_{20}$ partially fluorinated or perfluorinated aliphatic, alicyclic, or aromatic hydrocarbon group, optionally interrupted one or more times with an oxygen atom. For example, the fluorinated group can be, but is not limited to, $CF_3CH_2CH_2$—, $C_2F_5CH_2CH_2$—, n-$C_6F_{13}CH_2CH_2$—, i-$C_3F_7OCH_2CH_2CH_2$—, n-$C_8F_{17}CH_2CH_2$— and n-$C_{10}F_{21}CH_2CH_2$—.

The matrix polymer or a matrix prepolymer employed to form the matrix is at least partially fluorinated. For example, the matrix polymer can be a poly(tetrafluoroethylene-alt-alkyl vinyl ether) (FEVE) that is substituted on a portion of the vinyl ether repeating units with hydroxyl functionality that is crosslinked with a di- or higher functionality agent that undergoes addition reaction with the hydroxyl groups, for example, hexamethylene diisocyanate (HDI) or the trimeric isocyanate from the condensation of HDI with water. The polymer can be a vinyl addition polymer, prepared by free radical, ionic, metathesis, Ziegler-Natta, or any other method where the copolymer has at least one group for forming a crosslink. Other fluorinated polymers can be prepared by ring-opening or condensation polymerization routes, for example, fluorinated polyesters, polyethers, polyurethanes, polyureas, polyamides, polyimides, or any other condensation polymer. The polymer can be linear, branched, or hyper-branched. Monomers that can be polymerized or copolymerized by one or more of these methods include, but are not limited to, 2,2,2-trifluoroethyl acrylate, 2,2,2-trifluoroethyl methacrylate, bis-(2,2,2-trifluoroethyl) itaconate, hexafluoro-iso-propyl methacrylate, 1,1,1,3,3,3-hexafluoroisopropyl acrylate, bis-(1,1,1,3,3,3-hexafluoroisopropyl) itaconate, 1H,1H,3H-tetrafluoropropyl methacrylate, 1H,1H,3H-hexafluorobutyl acrylate, 1H,1H,3H-hexafluorobutyl methacrylate, 1H,1H-heptafluorobutyl acrylate, 1H,1H,5H-octafluoropentyl acrylate, 1H,1H,5H-octafluoropentyl methacrylate, pentafluorophenyl acrylate, pentafluorophenyl methacrylate, perfluorocyclohexylmethyl acrylate, perfluorocyclohexylmethyl methacrylate, 1H,1H,7H-dodecafluoroheptyl methacrylate, 1H,1H,2H,2H-perfluorooctyl acrylate, 1H,1H,2H,2H-perfluorooctyl itaconate, 1H,1H-perfluorooctyl acrylate, 1H, 1H-perfluorooctyl methacrylate, bis(perfluorooctyl)itaconate, 1H, 1H,2H,2H-heptadecafluorodecyl acrylate, 1H, 1H,2H,2H-heptadecafluorodecyl methacrylate, 1,1,5,5-tetrahydroperfluoro-1,5-pentanediol dimethacrylate, 4-vinylbenzyl perfluorooctanoate, bis(1H, 1H,2H,2H-perfluorooctyl)maleate, allyl perfluoroheptanoate, allyl perfluorooctanoate, allyl perfluorononanoate, vinyl perfluoroheptanoate, vinyl perfluorooctanoate, vinyl perfluorononanoate, and perfluorocyclopentene. A fluorinated polymer can be one that displays a glass transition temperature or a melting temperature that is in excess of the use temperature of the article. A copolymer can be used where crosslinkable functionality resides on at least one repeating unit of a copolymer, where the copolymer can self-react to form crosslinks between repeating units of the polymers, or can form crosslinks with a complementary functionality found in a small molecule or oligomer that can form crosslinks with the polymer or copolymer. The crosslink can comprise a urethane, urea, ester, amide, imide, bicycloalkene, or triazole. Crosslinking can be performed by an addition or condensation reaction, for example, but not limited to, an esterification, amidation, imidization, alcohol-isocyanate reaction, amine-isocyantate reaction, Diels-Alder cycloaddition, Huisgen cycloaddition, vinyl addition, or any other addition or condensation reaction. A catalyst or initiator for the reaction can be included, including an acid, base, radical initiator, nucleophilic initiator, or a metallic catalyst. The crosslinking reaction can be promoted by heating or irradiating with any wavelength from the electromagnetic spectrum, including, but not limited to, visible light, UV-light, and x-ray.

In an embodiment of the invention, a polymer or polymer precursor to the matrix polymer is combined with the fluorinated high aspect particles, optionally a solvent, optionally a cross-linking agent, and optionally a catalyst or initiator to form a fluid. The fluorinated particles are combined with the fluid to form a suspension. The resulting suspension is dispersed on a surface of an article by dipping, roll-coating, spray-coating, or any other method for applying a fluidized particulate comprising coating to a surface. After coating, any solvent is evaporated to leave the cured or uncured polymer-particulate composite on the surface of the article. Subsequently, cross-linking between functional groups of the polymer, copolymer, or polymer precursor can be carried out thermally or photochemically as required, wherein the matrix is fixed and a stable superhydrophobic and oleophobic surface having fixed features derived from the high aspect ratio particles is achieved.

Methods and Materials

Figure 2:
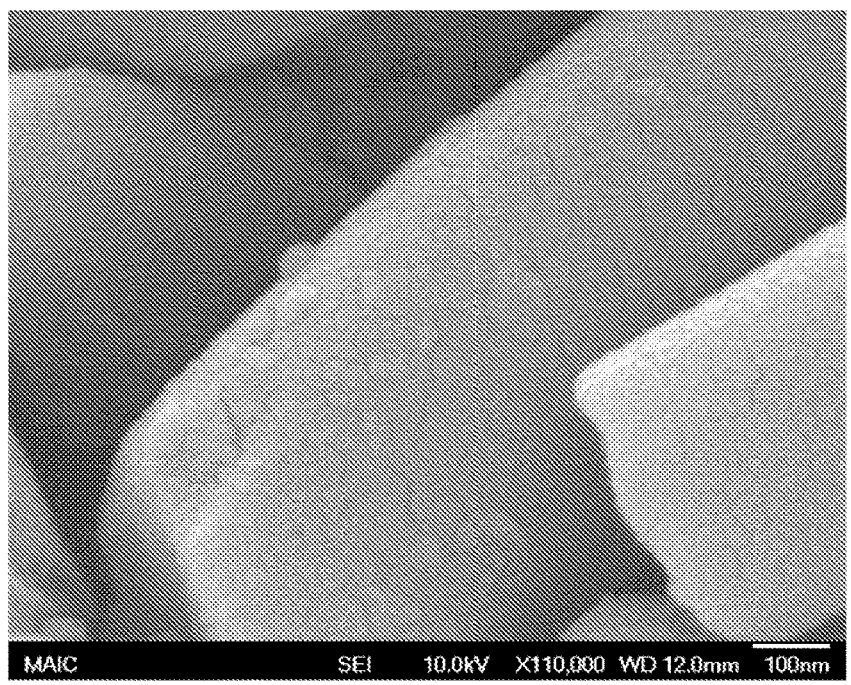
FIG. 2 is the scanning electron micrograph of FIG. 1 at 10000X magnification showing some of the individual fibers with nanoscale roughness.
Figure 3A:
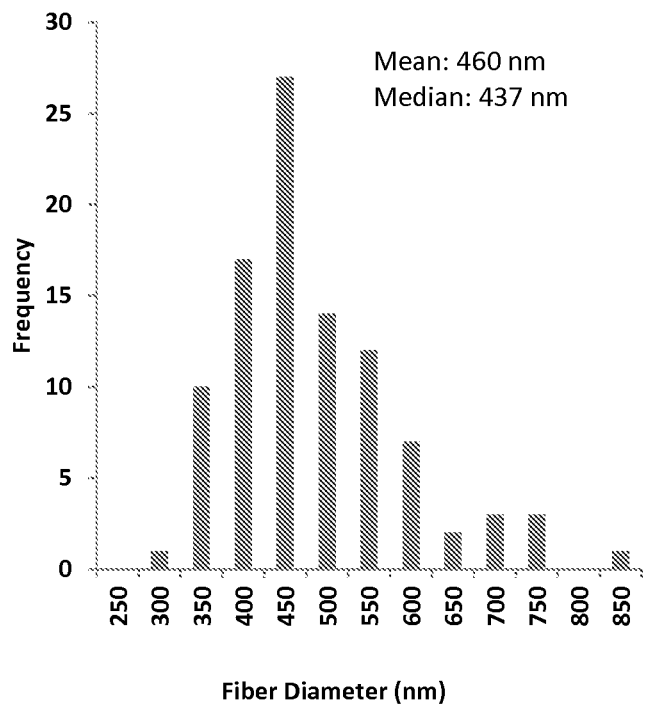
FIG. 3A is a histogram of titania-silica fiber diameter that are used to form ceramic-polymer composites and FIG. 3B is a histogram of titania-silica fiber lengths that are used to form ceramic-polymer composites, according to an embodiment of the invention.
Figure 3B:
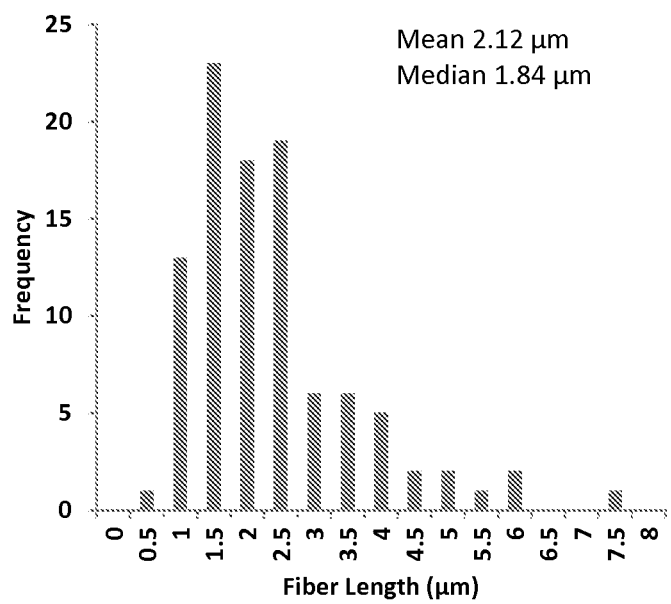

Submicron diameter titania-silica ceramic fibers were produced by performing sol-gel electrospinning A Titania-silica sol is disclosed in Biswas et al. "Flexible Ceramic Nanofibermat Electrospun from $TiO_2$—$SiO_2$ Aqueous Sol" *Ceramics International.* 2012, 38, 883-6, which is incorporated by reference herein. A titania sol from glycydoxy propyl trimethoxysilane (GPTMS) and titanium butoxide and a silica sol from tetraethoxysilane were combined. The sol size was regulated by acidification using 0.005N nitric acid. Polyvinyl pyrrolidone (PVP) was used as the electrospinning medium to form fibers, which were subsequently calcined to yield the ceramic submicron diameter fibers. The fibers were subjected to ball milling for two minutes, to yield a broad distribution of shortened fibers, as shown in FIG. 1. The surface of the polymer-titania-silica fiber displayed nanoscale roughness, as shown in FIG. 2. Fiber measurements were made using ImageJ (http://imagej.nih.gov/ij) with data processing and analysis carried out using Microsoft Excel® (Office 2010). The fibers have a mean diameter of 460 nm and a median diameter of 437 nm, as shown in the histograms of fiber diameter and length of FIG. 3A. and FIG. 3B. The average fiber length is 2.12 µm and the median length is 1.84 µm.

The ball milled fibers were rendered hydrophobic by treatment with heptadecafluoro-1,1,2,2-tetrahydradecyl trichlorosilane in chloroform. The hydrophobic titania-silica fibers were dispersed in an isopropanol solution of poly (tetrafluoroethylene-alt-alkyl vinyl ether) (FEVE) wherein a portion of the alkyl vinyl ether units are substituted by a hydroxyl functionality, which is commercially available as Lumiflon® from Asahi Glass Chemicals, and a crosslinking trimeric isocyanate from the condensation of hexamethylene diisocyanate (HDI) with water, which is commercially available as Desmodur N3300 (Bayer Materials Science) and dibutyltin dilaurate (Sigma-Aldrich) as catalyst to yield a polymer-titania-silica fiber dispersion.

Figure 4:
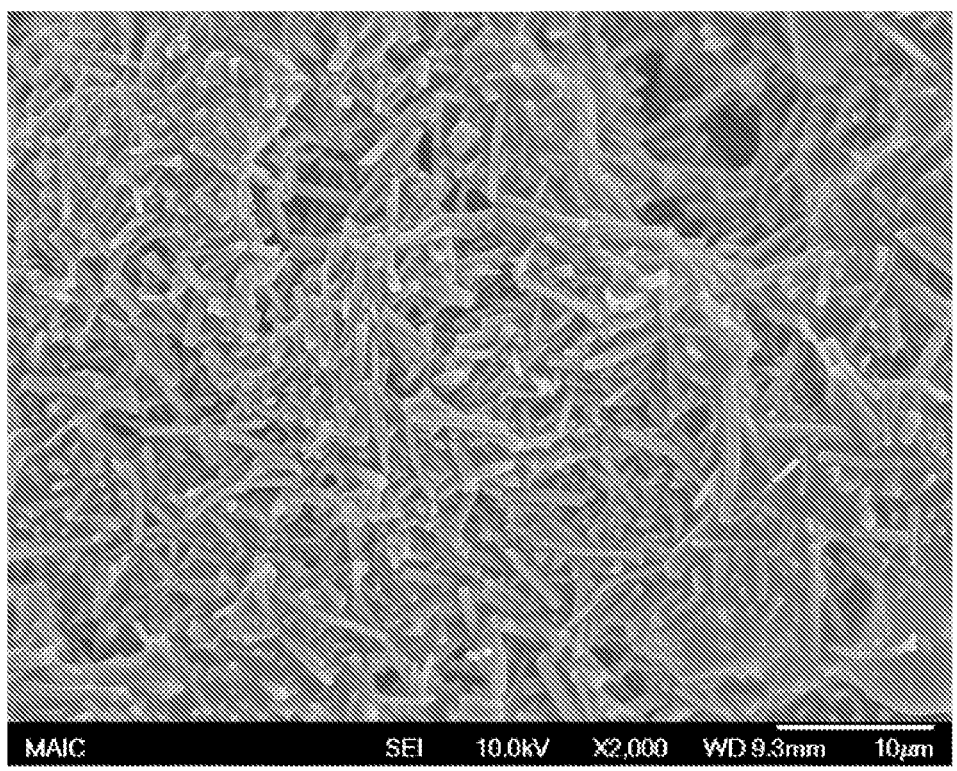
FIG. 4 is a scanning electron microscopy image of a freshly coated ceramic polymer composite coating, according to an embodiment of the invention.

Coating of the surface was carried out by brushing or spraying the polymer-titania-silica fiber-crosslinker dispersion on a surface. The cured surface displayed multiple scales of roughness in the microscale range, as shown in FIG. 4. The roughness provided lotus effect structures for superhydrophobicity and plastron effect structures for oleophobicity.

Figure 5:
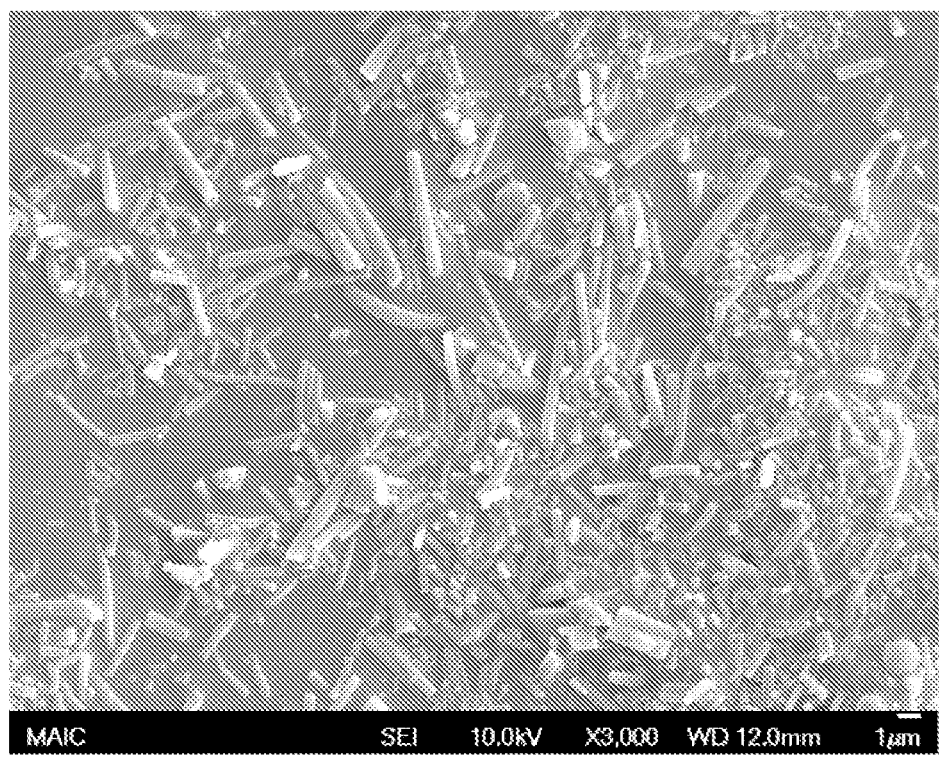
FIG. 5 is a scanning electron microscopy image of a coated ceramic polymer composite coating, according to an embodiment of the invention, after 20 abrasive strokes.

Abrasion tests were conducted in duplicate by stroking the crosslinked polymer-titania-silica fiber composite coating with #0000 steel wool for 10 and 20 strokes. A significant proportion of the features were retained even after twenty rubbings with steel wool, as shown in FIG. 5.

Figure 6A:
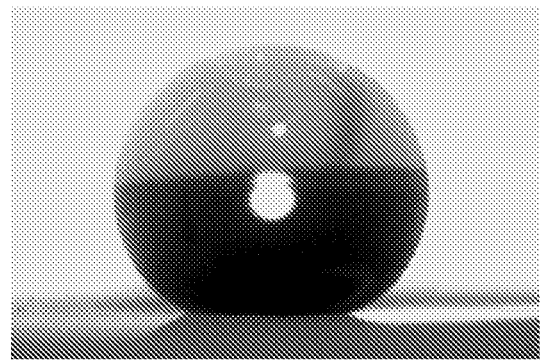
FIG. 6A is a photograph of a water drop on a freshly coated ceramic polymer composite, according to an embodiment of the invention, showing superhydrophobicity.
Figure 6B:
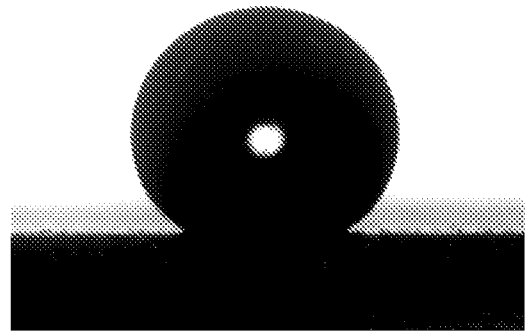
FIG. 6B is a photograph of a water drop on the coated ceramic polymer composite of FIG. 6A after 20 abrasive strokes with steel wool, showing high hydrophobicity according to an embodiment of the invention.
Figure 7:
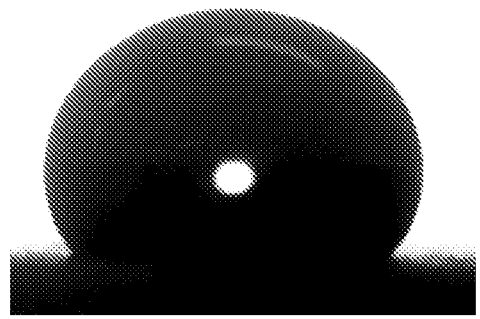
FIG. 7 is a photograph of an olive oil drop on a freshly coated ceramic polymer composite, according to an embodiment of the invention, showing oleophobicity.

The hydrophobic and oleophobic properties of the cured surface were characterized by contact angle measurements performed using a Rame-Hart goniometer in the sessile drop mode. FIG. 6A shows a water sessile drop on a fresh crosslinked polymer-titania-silica fiber composite, which displays a superhydrophobic surface. FIG. 6B shows a water sessile drop on the same surface after 20 steel wool strokes, displaying a high hydrophobicity. FIG. 7 shows an olive oil sessile drop on the crosslinked polymer-titania-silica fiber composite, displaying oleophobicity. As is apparent from Table 1, the addition of the hydrophobic fibers significantly increased the contact angle of water and oil drops on the crosslinked polymer-titania-silica fiber composite coating over that of a fiber free coating. Even after 20 abrasive strokes, a large contact angle was still present.

TABLE 1

Water, oil contact angles and Roll-off angles on the various surfaces

| Sample Type | Sessile Drop Water Contact Angle | Sessile Drop Olive Oil Contact Angle | Water Roll-off/Sliding Angle |
| --- | --- | --- | --- |
| Cross linked paint coating | 58° ± 6° | 16° ± 3° | Droplet Sticks |
| Cross linked fiber paint composite coating | 158° ± 4° | 104° ± 4° | 6° ± 15° |
| Cross linked fiber paint composite coating: 10 abrasion strokes | 145.6 ± 5.4° | — | 45°-50° (sliding) |
| Fiber cross linked paint composite coating: 20 abrasion strokes | 143.3 ± 3.4° | — | >80° |

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

We claim:

1. A ceramic-polymer composite, comprising a polymer matrix and dispersed glass, ceramic, and/or ceramic-polymer particles, wherein the glass, ceramic and/or ceramic-polymer particles display an aspect ratio of 1:1 to 1:500 and are 1 nm to 100 microns in an axial dimension, wherein the glass, ceramic and/or ceramic-polymer particles have a fluorinated surface, and wherein the polymer matrix comprises a polymer or copolymer with at least one fluorinated repeating unit, wherein the fluorinated repeating unit comprises one or more of the addition products of tetrafluoroethylene, 2,2,2-trifluoroethylacrylate, 2,2,2-trifluoroethyl methacrylate, bis-(2,2,2-trifluoroethyl) itaconate, hexafluoro-iso-propyl methacrylate, 1,1,1,3,3,3-hexafluoroisopropyl acrylate, bis-(1,1,1,3,3,3-hexafluoroisopropyl) itaconate, 1H, 1H, 3H-tetrafluoropropyl methacrylate, 1H, 1H, 3H-hexafluorobutyl acrylate, 1H, 1H, 3H-hexafluorobutyl methacrylate, 1H,1H-heptafluorobutyl acrylate, 1H, 1H,5H-octafluoropentyl acrylate, 1H, 1H, 5H-octafluoropentyl methacrylate, pentafluorophenyl acrylate, pentafluorphenyl methacrylate, perfluorocyclohexylmethyl acrylate, perfluorocyclohexylmethyl methacrylate, 1H,1H,7H-dodecafluoroheptyl methacrylate, 1H,1H,2H,2H-perfluorooctyl acrylate, 1H,1H,2H,2H-perfluorooctyl itaconate, 1H,1H-perfluoroctyl acrylate, 1H, 1H-perfluorooctyl methacrylate, bis(perfluorooctyl)itaconate, 1H,1H,2H,2H-heptadecafluorodecyl acrylate, 1H,1H,2H,2H-heptadecafluorodecyl methacrylate, 4-vinylbenzyl perfluorooctanoate, bis(1H,1H,2H,2H-perfluoroctyl)maleate, allyl perfluorooctanoate, allyl perfluorononanoate, vinyl perfluoroheptanoate, vinyl perfluorooctanoate, vinyl perfluorononanoate, and perfluorocyclopentene.

2. The ceramic-polymer composite of claim 1, wherein the glass, ceramic, and/or ceramic-polymer particles are 10 to 80 weight percent of the ceramic-polymer composite.

3. The ceramic-polymer composite of claim 1, wherein the glass, ceramic, and/or ceramic-polymer particles comprise ZnO, CdO, $SiO_2$, $GeO_2$, $TiO_2$, $ZrO_2$, $CeO_2$, $SnO_2$, BeO, $Al_2O_3$, corundum, boehmite, AlO(OH), MgO, $ZrO_2In_2O_3$, $La_2O_3$, $Fe_2O_3$, $Cu_2O$, TaZOS, $Nb_2O_5$, $V_2O_5$, $MoO_3$, $WO_3$, indium-tin-oxide (ITO), antimony-tin-oxide (ATO), fluorine-doped tin oxide (FTO), Perovskites including $BaTiO_3$ and $PbTiO_3$, chalcogenides, CdS, ZnS, PbS, AgZS, GaSe, CdSe, ZnSe, ZnTe, CdTe, AgCl, AgBr, AgI, CuCl, CuBr, $CdI_2$, $PbI_2$, $CdC_2$, SiC, $MoSi_2$, AlAs, GaAs, GeAs, InSb, BN, AN, $Si_3N_4$, $Ti_3N_4$, GaP, InP, $Zn_3P_2$, $Cd_3P_2$, metal carbonates, metal sulfates, metal phosphates, metal silicates, metal zirconates, metal aluminates, metal stannates, Si, talcum, clays, mica, magnetite, maghemite, spinels, mullite, eskolaite, tialite, calcium phosphate, hydroxyapatite, borosilicate glass, soda lime glass, silica glass, silicon nitride, silicon carbide, boronitride, borocarbide, quartz, cristobalite, tripolite, novaculite, diatomite, silica, pyrogenic silicic acids, precipitated silicic acids, silica gels, silicates, talcum, pyrophylite, muscovite, phlogopite, vermiculite, Wollastonite, perlites, calcites, dolomites, chalk, calcium carbonates, spar, iron mica, or any combination thereof.

4. The ceramic-polymer composite of claim 1, wherein the polymer matrix is poly(tetrafluoroethylene-alt-alkyl vinyl ether) (FEVE) with a portion of the vinyl ether groups comprising a hydroxyl group, and cross-links formed between the hydroxyl groups and hexamethylene diisocyanate (HDI) or a trimeric isocyanate from HDI.

5. The ceramic-polymer composite of claim 1, wherein the glass, ceramic, or ceramic-polymer particles have nanoscale roughness.

6. An article comprising a superhydrophobic and oleophobic surface comprising the ceramic-polymer composite according to claim 1.

7. A method of forming a superhydrophobic and oleophobic surface on a substrate, wherein the surface comprises the ceramic-polymer composite according to claim 1, the method comprising
providing a polymer or polymer precursor comprising a polymer or a copolymer with at least one fluorinated repeating unit, wherein the fluorinated repeating unit comprises one or more of the addition products of tetrafluoroethylene, 2,2,2-trifluoroethylacrylate, 2,2,2-trifluoroethyl methacrylate, bis-(2,2,2-trifluoroethyl) itaconate, hexafluoro-iso-propyl methacrylate, 1,1,1,3,3,3-hexafluoroisopropyl acrylate, bis-(1,1,1,3,3,3-hexafluoroisopropyl) itaconate, 1H, 1H, 3H-tetrafluoropropyl methacrylate, 1H, 1H, 3H-hexafluorobutyl acrylate, 1H, 1H, 3H-hexafluorobutyl methacrylate, 1H,1H-heptafluorobutyl acrylate, 1H, 1H,5H-octafluoropentyl acrylate, 1H, 1H, 5H-octafluoropentyl methacrylate, pentafluorophenyl acrylate, pentafluorphenyl methacrylate, perfluorocyclohexylmethyl acrylate, perfluorocyclohexylmethyl methacrylate, 1H,1H,7H-dodecafluoroheptyl methacrylate, 1H,1H,2H,2H-perfluorooctyl acrylate, 1H,1H,2H,2H-perfluorooctyl itaconate, 1H,1H-perfluoroctyl acrylate, 1H, 1H-perfluorooctyl methacrylate, bis(perfluorooctyl)itaconate, 1H,1H,2H,2H-heptadecafluorodecyl acrylate, 1H,1H,2H,2H-heptadecafluorodecyl methacrylate, 4-vinylbenzyl perfluorooctanoate, bis(1H,1H,2H,2H-perfluoroctyl)maleate, allyl perfluorooctanoate, allyl perfluorononanoate, vinyl perfluoroheptanoate, vinyl perfluorooctanoate, vinyl perfluorononanoate, and perfluorocyclopentene, and wherein a copolymer optionally comprises repeating units with one or more crosslinkable functionalities;
providing a plurality of glass, ceramic, and/or ceramic-polymer particles, wherein the glass, ceramic, and/or ceramic-polymer particles have a fluorinated surface;
optionally providing one or more crosslinking reagent wherein the crosslinking reagent comprises a complementary functionality to the one or more crosslinkable functionalities of the polymer or polymer precursor;
optionally providing a solvent;
optionally providing a catalyst and/or initiator;
combining the polymer or polymer precursor, the plurality of glass, ceramic and/or ceramic-polymer particles, the optional crosslinking reagent, the optional solvent, and the optional catalyst and/or initiator to form a fluid coating mixture;
coating the fluid coating mixture on at least one portion of a surface of a substrate;
optionally removing the solvent; and
optionally promoting a reaction between the crosslinkable functionalities and the optional crosslinking reagent, wherein at least a portion of the surface is coated with a ceramic-polymer composite, and wherein the portion of the surface displays superhydrophobic and oleophobic properties.

8. The method according to claim 7, wherein the step of coating comprises dip coating, roll coating, or spray coating.

9. The method according to claim 7, wherein the step of promoting comprise heating or irradiating.

10. The ceramic-polymer composite of claim 3, wherein the glass, ceramic, and/or ceramic-polymer particles comprise a kaolin clay.

* * * * *